(12) United States Patent
Bradley et al.

(10) Patent No.: US 8,999,605 B2
(45) Date of Patent: Apr. 7, 2015

(54) FUEL CELL PLATES PRODUCED FROM LAYERED MATERIALS

(75) Inventors: John R. Bradley, Clarkston, MI (US); Mahmoud H. Abd Elhamid, Grosse Pointe Woods, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1492 days.

(21) Appl. No.: 12/271,972

(22) Filed: Nov. 17, 2008

(65) Prior Publication Data

US 2010/0124675 A1 May 20, 2010

(51) Int. Cl.
H01M 4/66 (2006.01)
H01M 8/02 (2006.01)

(52) U.S. Cl.
CPC .......... *H01M 8/0206* (2013.01); *H01M 8/0208* (2013.01); *H01M 8/0221* (2013.01); *H01M 8/0228* (2013.01); *Y02E 60/50* (2013.01)

(58) Field of Classification Search
CPC H01M 8/0206; H01M 8/0808; H01M 8/0228
USPC .................................. 429/512–522, 433–434
See application file for complete search history.

(56) References Cited

U.S. PATENT DOCUMENTS 2,908,068 A * 10/1959 Biel et al. .......................... 492/31
5,776,624 A * 7/1998 Neutzler ......................... 429/437
2006/0194095 A1* 8/2006 Vyas et al. ....................... 429/38
2010/0196784 A1* 8/2010 Kimura et al. ................. 429/483
2010/0260928 A1* 10/2010 Hasegawa et al. ............ 427/115

OTHER PUBLICATIONS

Michael C. Kimble, et al., "Characterization of Corrosion-Protective Methods for Electrically Conductive Coatings on Aluminum", American Electroplaters and Surface Finishers Society, AESF SUR/FIN '99 Proceedings, Jun. 21-24, 1999, 12 pages.

A.S. Woodman, et al., "Development of Corrosion-Resistant Coatings for Fuel Cell Bipolar Plates", American Electroplaters and Surface Finishers Society, AESF SUR/FIN '99 Proceedings, Jun. 21-24, 1999, 9 pages.

Yue Hung, et al., "Corrosion-Resistant Lightweight Metallic Bipolar Plates for PEM Fuel Cells", Journal of Applied Electrochemistry (2005) 35: 445-447, 3 pages.

Yue Hung, et al., Testing and Evaluation of Aluminum Coated Bipolar Plates of PEM Fuel Cells Operating at 70° C., Fuelcell-74018, Third International Conference on Fuel Cell Science, Engineering and Technology, May 23-25, 2005, Ypsilanti, Michigan, 4 pages.

* cited by examiner

Primary Examiner — David C Mellon
(74) Attorney, Agent, or Firm — BrooksGroup

(57) ABSTRACT

One exemplary embodiment discloses a bipolar plate assembly including a cathode plate and an anode plate. Each of the cathode plate and the anode plate includes a core material, a first surface material coupled to a first side of the core material, and a second surface material coupled to a second side of the core material, wherein the first surface material and the second surface material have a different composition from the core material.

10 Claims, 3 Drawing Sheets

FUEL CELL PLATES PRODUCED FROM LAYERED MATERIALS

TECHNICAL FIELD

The technical field generally relates to fuel cells systems and more specifically to layered fuel cell plates for use in a fuel cell system.

BACKGROUND

Fuel cell plates, otherwise known as bipolar plates, serve several functions in a fuel cell stack. Ideally, the material for forming a fuel cell plate should have relatively high electrical conductivity, relatively low contact resistance and relatively high corrosion resistance. In addition, the fuel cell plates should have a degree of chemical stability such that they do not contaminate a polymer exchange membrane. Further, it is desirable that fuel cell plates have adequate hydrophilicity for water management, sufficient strength to resist deflection and deformation during compression of the fuel cell stack during assembly, relatively high formability, resistance to surface migration of magnesium, and other properties.

It is relatively difficult, however, to provide a fuel cell plate having all of the desired properties in a single plate material.

SUMMARY OF EXEMPLARY EMBODIMENTS OF THE INVENTION

One exemplary embodiment discloses a bipolar plate assembly including a cathode plate and an anode plate. Each of the cathode plate and anode plate includes a core material, a first surface material coupled to a first side of the core material, and a second surface material coupled to a second side of the core material, wherein the first surface material and the second surface material have a different composition from the core material.

In another exemplary embodiment, a fuel cell may be formed including a pair of bipolar plate assemblies as described in the previous paragraph and a soft goods portion, wherein each of said pair of bipolar plate assemblies is coupled to opposite sides of said soft goods portion.

Another exemplary embodiment includes a method for forming the bipolar plate including first forming a cathode plate and an anode plate and coupling the two plates together, wherein each of the plates includes a core material, a first surface material coupled to a first side of the core material, and a second surface material coupled to a second side of the core material, wherein the first surface material and the second surface material of each respective plate have a different composition from the core material of the respective plate.

Another exemplary embodiment includes a method for forming a fuel cell wherein a pair of bipolar plate assemblies may be formed in accordance with the previous paragraph and subsequently be coupled on opposite sides of a soft goods portion.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary (illustrative) in nature and is in no way intended to limit the invention, its application, or uses.

Figure 1:
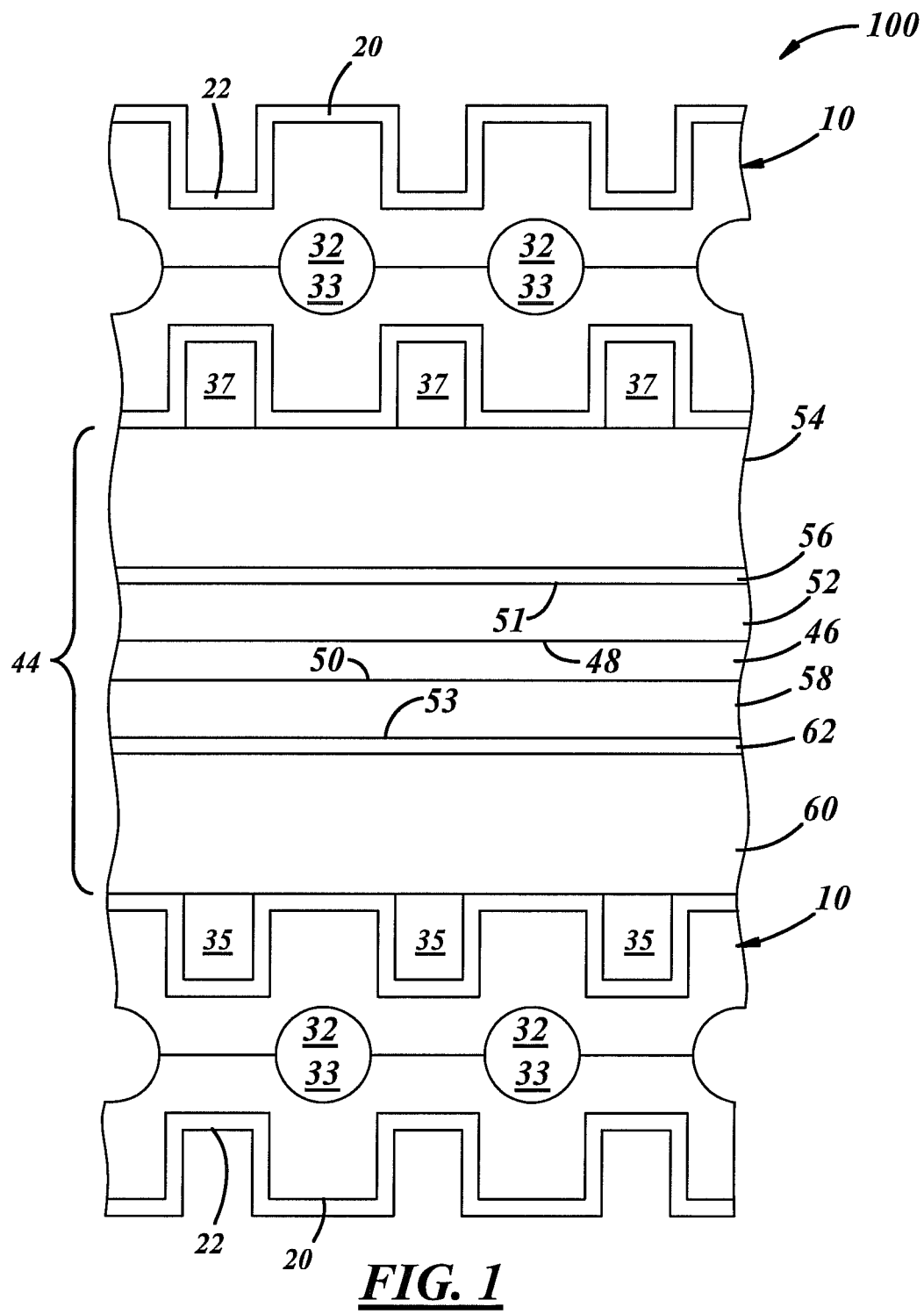
FIG. 1 is a schematic representation of a fuel cell stack according to one exemplary embodiment.

Referring now to FIG. 1, one exemplary embodiment includes a product 100 such as a fuel cell stack, here being a PEM (proton exchange membrane) fuel cell stack, including a soft goods portion 44 which may include a membrane 46 having a first face 48 and a second face 50, a cathode electrode 52 may be provided over the first face 48 of the membrane 46 and an anode electrode 58 may be provided over the second face 50 of the membrane 46. The fuel cell stack 100 may include a bipolar plate assembly 10, or fuel cell plate 10, that may include one or more lands 20 and channels 22. The bipolar plate assembly 10 may be configured to define one or more coolant flow channels 32 for flowing cooling fluid through the center of the bipolar plate assembly 10 to cool same.

The fuel cell stack 100 may also include a cathode side gas diffusion media layer 54 which may have a microporous layer 56 thereon may be interposed between the cathode electrode 52 and the bipolar plate assembly 10. Similarly, an anode side gas diffusion media layer 60 having a microporous layer 62 thereon may be interposed between the anode catalyst layer 58 and a second bipolar plate assembly 10.

Figure 2:
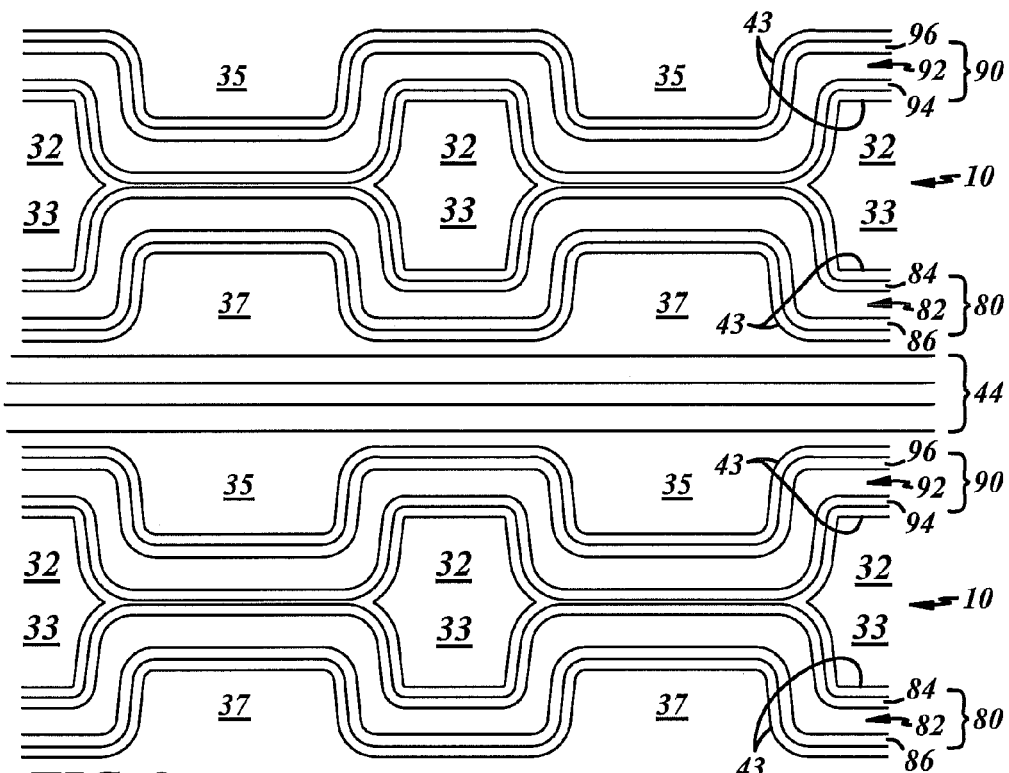
FIG. 2 is a close-up view of a portion of FIG. 1.

Referring now to FIG. 2, a close-up view of the bipolar plate assemblies 10, in accordance with an exemplary embodiment, may be provided. Each bipolar plate assembly 10 may include a cathode plate 80 and an anode plate 90 joined by welding, adhesive bonding or other means.

The cathode plate 80, in one exemplary embodiment, may include a core material 82 interposed between surface materials 84 and 86. Similarly, the anode plate 90 may consist of a core material 92 interposed between surface materials 94 and 96. The surface materials 84, 94 may define the afore-mentioned coolant flow channels 32 there between.

The core materials 82 and 92 may, from a compositional standpoint, be formed from the same material or differing materials that may be optimized for low mass, strength, material cost, formability and other mechanical and physical properties. In addition, in select embodiments the core materials 82, 92 may be selected for their respective abilities to respond to post-form heat treatment to increase strength after forming.

One exemplary core material 82, 92 that may be utilized is an aluminum alloy. One specific class of aluminum alloys is the so-called 5000 series aluminum alloys. The designation "5000 series" on any other "series" relating to a particular aluminum alloy in the disclosure is a four-digit designation of a wrought aluminum alloy numbered in accordance with the International Alloy Designation System ("IADS"), introduced in about 1970 by the Aluminum Association of the United States. One specific exemplary aluminum alloy is the 5083 aluminum alloy. Other exemplary core materials 82, 92 that may also be utilized include, but are not limited to, stainless steel or magnesium or other materials that may be optimized for low mass, strength, material cost, formability and other mechanical and physical properties.

The surface materials 84 and 94 may, from a compositional standpoint, be formed from the same material or differing materials that may be optimized for contact with the coolant fluid 33 flowing within the coolant channels 32. In addition, the surface material 84 may be optimized for bonding or low contact resistance to the surface material 94, and vice versa.

Exemplary materials that may be utilized as the surface materials 84 and 94 may include aluminum alloys having a differing composition from the aluminum alloy used in the core 82 or 92, unalloyed aluminum, gold and its alloys, titanium and its alloys, niobium and its alloys, tantalum and its alloys, stainless steel, nickel and its alloys, carbon and combinations thereof. Unalloyed aluminums, otherwise known as "super-purity" aluminums, that may be utilized as the surface materials 84 or 94 include the so-called 1000 series aluminums, including, for example, 1180 aluminum.

Surface materials 86 and 96 may come in contact with the reactant gases (hydrogen and oxygen), the respective gas diffusion media layers 54, 60, and water. The surface materials 86, 96 therefore may be designed to withstand degradation associated with water management, corrosion resistance, and other properties.

The surface materials 86, 96 may be formed from the same material or different material. However, given the fact that the surface material 86 of the cathode 80 may more likely be in close contact with cathode reactant gases such as oxygen flowing in the cathode plate channels 37 (defined between the surface material 86 and the cathode side gas diffusion membrane 54), while the surface material 96 of the anode 90 may more likely be in close contact with anode reactant gases such as hydrogen flowing in the anode plate channels 35 (defined between the surface material 96 and the anode side gas diffusion membrane 60), the composition of the surface material 86 and surface material 96 are more likely to be different to accommodate such a different immediate environment.

Exemplary materials that may be utilized as the surface materials 86 and 96 may include aluminum alloys having a differing composition from the aluminum alloy used in the core 82 or 92, aluminum alloys having a differing composition from the aluminum alloy used in the core 82 or 92 and in the surface materials 84 and 94, unalloyed aluminum, gold and its alloys, titanium and its alloys, niobium and its alloys, tantalum and its alloys, stainless steel, nickel and its alloys, carbon and combinations thereof.

In another exemplary embodiment, a coating 43 may be provided on or near one or more of the outer surface of the respective surface materials 84, 86, 94 and 96. The coating 43 may be optimized for its ability to accept and retain surface modification that may be deemed desirable. For example, the coating 43 may be a silicon oxide-based coating. In another example, the coating 43 may be a hydrophilic coating.

In another exemplary embodiment, the outer surface of one or more of the respective surface materials 84, 86, 94 and 96 may itself be made hydrophilic, as opposed to the introduction of a separate coating 43. For example, if the outer layer of one or more of the respective surface materials 84, 86, 94 and 96 is Titanium, it may be possible to grow a hydrophilic layer of Titanium Oxide in situ.

Figure 3:
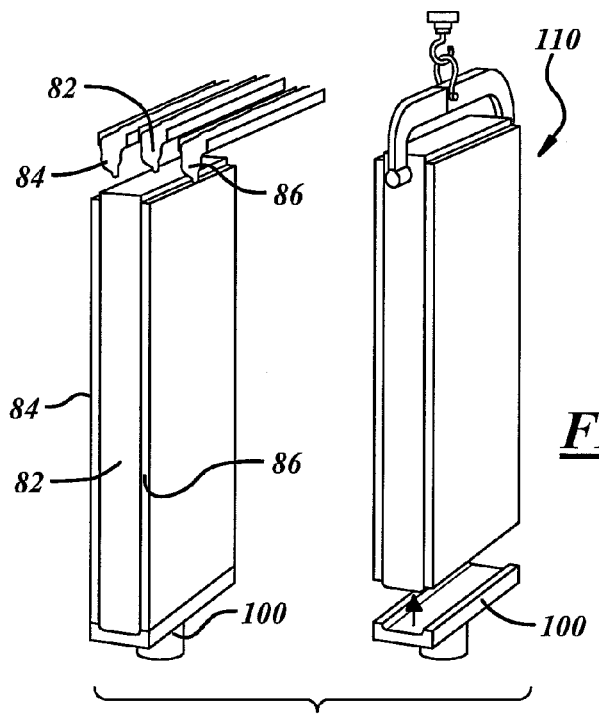
FIGS. 3-6 is a schematic representation of an exemplary process for forming a bipolar plate assembly for use in the fuel cell stack of FIG. 1.
Figure 4:
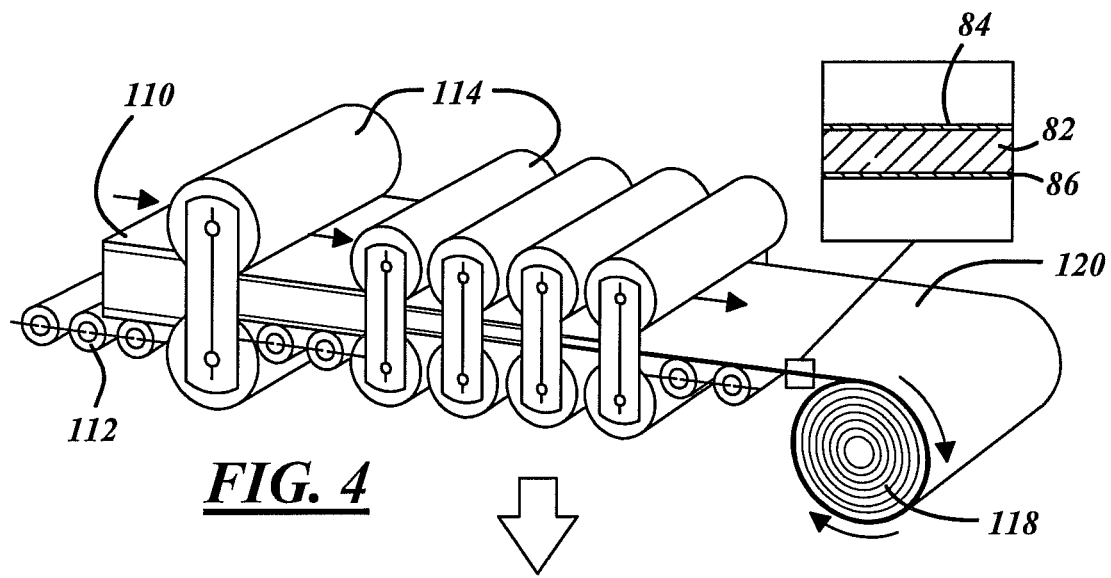
Figure 5:
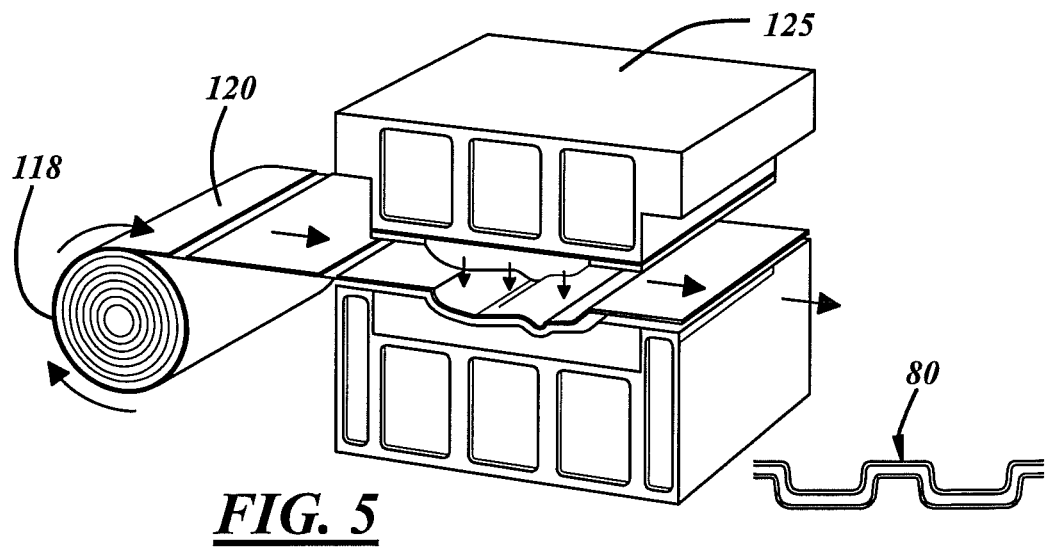

The cathode plate 80 and anode plate 90 may be formed individually in one exemplary process as shown in FIGS. 3-5. For illustrative purpose, the formation of the cathode plate 80 is described in the following paragraphs and Figures, but a substantially similar process may be used to form the anode plate 90 with one possible modification being the composition of any of the materials 82, 84, 86 of the cathode plate 80 being different than the composition of materials 92, 94, 96 of the anode plate 90 and is thus not repeated herein.

Referring first to FIG. 3, utilizing the Novelis Fusion™ technology (Novelis North America of Cleveland, Ohio), an ingot 110 may first be formed. To accomplish this, three molten aluminum alloys (made of materials 82, 84, 86 respectively) may be poured simultaneously into a mold 100, wherein they are allowed to solidify to form a single multi-alloy ingot 110.

Next, the ingot 110 may be rolled into a sheet product 120. To accomplish this, as shown in FIG. 4, the ingot 110 may be removed from the mold 100 and transferred to a conveyor belt 112 having multiple rollers 114. The ingot 110 may then be pressed between the multiple rollers 114 to form the sheet product 120 having a desired overall thickness. The sheet product 120 may then be rolled onto large coils 118 for transport.

Next, as shown in FIG. 5, the sheet product 120 may be unrolled from the coil 118 and stamped to a desired shape using a conventional stamping machine 125, therein forming the cathode plate 80.

Alternatively, the sheet product 120 may be formed to a desired shape to form the cathode plate 80 and/or anode plate 90 using an electromagnetic forming (EMF) process. In an EMF process, deformation of the sheet product 120 may be driven by the interaction of a current generated in the sheet product 120 with a magnetic field generated by a coil adjacent to the sheet product. In other alternative processes, the cathode plate 80 and/or anode plate 90 may be formed by other stamping processes such as electrohydraulic stamping, explosive stamping, and high velocity impact stamping.

Figure 6:
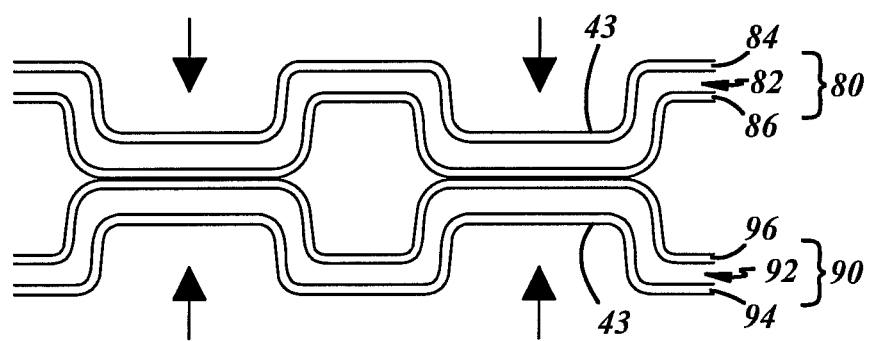

Finally, as shown in FIG. 6, the cathode plate 80 and an anode plate 90 may be coupled together to form a bipolar plate assembly 10 and placed into the fuel cell 10. This coupling may include the creation of a physical bond between the cathode plate 80 and anode plate 90, such as by welding or through the use of an adhesive (not shown). Alternatively, the coupling may simply consist of placing the plates 80, 90 in close proximity to another prior to introduction with the fuel cell 10.

In addition, in an alternative exemplary process prior to the coupling of the cathode plate 80 to the anode plate 90 as shown in FIG. 6, a coating 43 may be applied one or both of the outer surfaces of the materials 84, 86 using conventional coating techniques such as spraying, dipping, or the like.

The above description of embodiments of the invention is merely exemplary in nature and, thus, variations thereof are not to be regarded as a departure from the spirit and scope of the invention.

What is claimed is:

1. A fuel cell bipolar plate assembly comprising:
   a cathode plate comprising a core material, a first surface material coupled to a first side of said core material, and a second surface material coupled to a second side of said core material, said first surface material and said second surface material being directly coupled to said core material of the cathode plate simultaneously in their molten states; wherein said first surface material and said second surface material have a different composition from said core material; and
   an anode plate coupled to said cathode plate to define one or more coolant flow channels between the anode and cathode plates, said anode plate comprising a core material, a first surface material coupled to a first side of said core material, and a second surface material coupled to a second side of said core material, said first surface material and said second surface material being directly coupled to said core material of the anode plate simultaneously in their molten states; wherein said first surface material and said second surface material have a different composition from said core material;

wherein said first surface material of said cathode plate comprises at least one of aluminum alloys, gold and its alloys, titanium and its alloys, niobium and its alloys, tantalum and its alloys, stainless steel, nickel and its alloys, or combinations thereof; wherein said second surface material of said cathode plate comprises unalloyed aluminum wherein the composition of said first surface material of said cathode plate is different from the composition of said second surface material of said cathode plate wherein said core material of said cathode plate comprises aluminum.

2. The bipolar plate assembly of claim 1, wherein said core material of said anode plate comprises an aluminum alloy, stainless steel or magnesium.

3. The bipolar plate assembly of claim 2, wherein said first surface material of said anode plate comprises at least one of aluminum alloys, unalloyed aluminum, gold and its alloys, titanium and its alloys, niobium and its alloys, tantalum and its alloys, stainless steel, nickel and its alloys, carbon, or combinations thereof.

4. The bipolar plate assembly of claim 3, wherein said second surface material of said anode plate comprises unalloyed aluminum, wherein the composition of said first surface material of said anode plate is different from the composition of said second surface material of said anode plate.

5. The fuel cell bipolar plate assembly of claim 4, wherein said core material of the anode plate is a 5000 series aluminum alloy, and said unalloyed aluminum is a 1000 series aluminum under International Alloy Designation System.

6. The fuel cell bipolar plate assembly of claim 1, wherein said second surface material of the cathode plate comprises an unalloyed aluminum.

7. The fuel cell bipolar plate assembly of claim 6, wherein said core material of the cathode plate is a 5000 series aluminum alloy, and said unalloyed aluminum is a 1000 series aluminum under International Alloy Designation System.

8. The fuel cell bipolar plate assembly of claim 6 further comprises a hydrophilic coating disposed over the first surface material of the cathode plate.

9. A fuel cell bipolar plate assembly comprising:
a cathode plate comprising a core material, a first surface material coupled to a first side of said core material, and a second surface material coupled to a second side of said core material, said first surface material and said second surface material being directly coupled to said core material of the cathode plate simultaneously in their molten states; wherein said first surface material and said second surface material have a different composition from said core material; and
an anode plate coupled to said cathode plate to define one or more coolant flow channels between the anode and the cathode plate, said anode plate comprising a core material, a first surface material coupled to a first side of said core material, and a second surface material coupled to a second side of said core material, said first surface material and said second surface material being directly coupled to said core material of the anode plate simultaneously in their molten states; wherein said first surface material and said second surface material have a different composition from said core material;

wherein said first surface material of said anode plate comprises at least one of aluminum alloys, gold and its alloys, titanium and its alloys, niobium and its alloys, tantalum and its alloys, stainless steel, nickel and its alloys, carbon, or combinations thereof;

wherein said second surface material of said anode plate comprises unalloyed aluminum wherein the composition of said first surface material of said anode plate is different from the composition of said second surface material of said anode plate wherein said core material of said cathode plate is a 5000 series aluminum alloy, and said unalloyed aluminum is a 1000 series aluminum alloy under International Alloy Designation System.

10. A fuel cell including a pair of fuel cell bipolar plate assemblies and a membrane electrode assembly, wherein each of said pair of bipolar plate assemblies is coupled to opposite sides of said membrane electrode assembly; said fuel cell bipolar plate assembly comprising:
a cathode plate comprising a core material, a first surface material coupled to a first side of said core material, and a second surface material coupled to a second side of said core material, said first surface material and said second surface material being directly coupled to said core material of the cathode plate simultaneously in their molten states; wherein each of said first surface material and said second surface material have a different composition from said core material; and
an anode plate coupled to said cathode plate to define one or more coolant flow channels between the anode and the cathode plates, said anode plate comprising a core material, a first surface material coupled to a first side of said core material, and a second surface material coupled to a second side of said core material, said first surface material and said second surface material being directly coupled to said core material of the cathode plate simultaneously in their molten states; wherein each of said first surface material and said second surface material have a different composition from said core material;

wherein said first surface material of said cathode plate comprises at least one of aluminum alloys, gold, titanium, stainless steel, nickel or carbon;

wherein said second surface material of said cathode plate comprises unalloyed aluminum;

wherein said core material of said cathode plate comprises an aluminum alloy;

wherein said core material of said anode plate comprises an aluminum alloy;

wherein said first surface material of said anode plate comprises at least one of aluminum alloys, gold and its alloys, titanium and its alloys, niobium and its alloys, tantalum and its alloys, stainless steel, nickel and its alloys, carbon, or combinations thereof;

wherein said second surface material of said anode plate comprises unalloyed aluminum.

* * * * *